United States Patent Office 3,276,204
Patented Oct. 4, 1966

3,276,204
APPARATUS FOR SUPPLYING HEATED GASES
Eric Kellett, London, England, assignor to C.A.V.
Limited, London, England
Filed June 11, 1965, Ser. No. 463,140
Claims priority, application Great Britain, June 11, 1964,
19,511/64
4 Claims. (Cl. 60—39.31)

This invention relates to apparatus for supplying heated gases and has for its object to provide such apparatus in a simple and convenient form.

Apparatus in accordance with the invention comprises, in combination, a radial flow compressor having a rotor and a tangentially disposed outlet, a co-axially disposed radial flow turbnie having a rotor, a tangentially disposed inlet and an outlet through which gases leaving the turbine can pass, a rotary shaft, the rotors of the turbine and compressor being mounted at opposite ends respectively of the rotary shaft, a combustion chamber interconnecting the outlet of the compressor with the inlet of the turbine, a fuel spray nozzle mounted in the combustion chamber and a fuel pump defined by a pair of opposite hand screw threads formed about the axis of the shaft intermediate the rotors and driven by the shaft for delivering fuel under pressure from a source of fuel to the nozzle, the arrangement being such that, in use, heated gases leaving the combustion chamber will drive the turbine as they pass to the turbine outlet, with the turbine serving to drive the compressor and fuel pump to supply air and fuel respectively to the combustion chamber.

Figure 1:
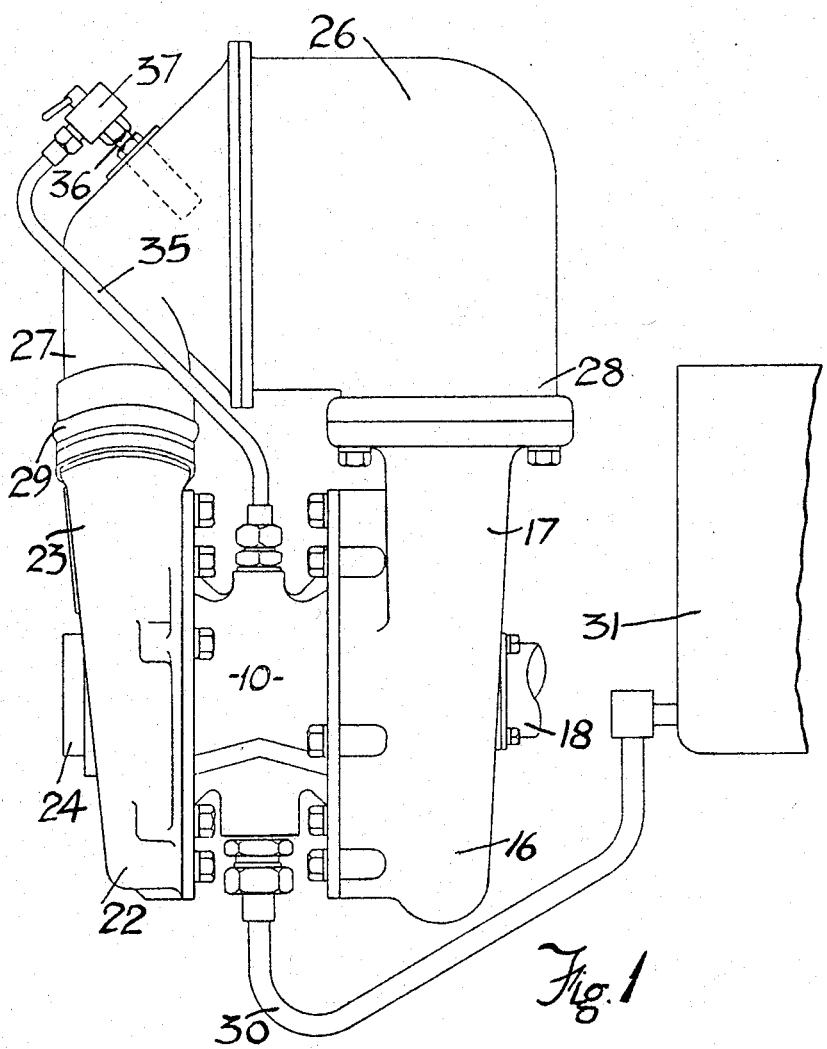
Figure 2:
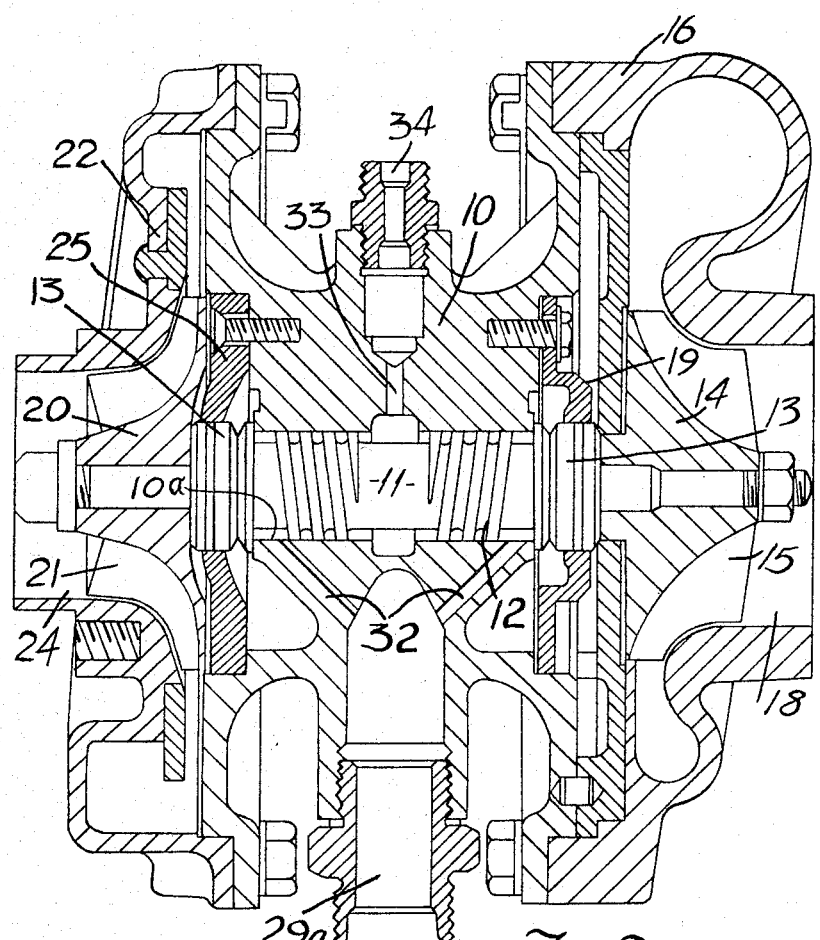

In the accompanying drawings:

FIGURE 1 is a view in elevation of one example of an apparatus in accordance with the invention and FIGURE 2 is a fragmentary view partly in section and partly in elevation of part of the apparatus shown in FIGURE 1.

Referring to the drawings, there is provided a body part 10 provided with a bore 10a in which is mounted a rotary shaft 11 having its opposite ends extending beyond the body part. The bearing for the shaft is constituted by the crests of a pair of opposite hand screw threads 12 formed on the shaft and mounted at opposite ends of the shaft respectively are a pair of thrust blocks 13 which locate the shaft against axial movement.

Mounted on one end of the shaft is a turbine rotor 14 having blades 15 and the rotor is accommodated within a turbine housing 16 secured to one end of the body part 10. The housing 16 is provided with a tangentially disposed inlet 17 for heated gases and an axially disposed outlet 18. Also provided at this end of the body part is an annular seal plate 19 which is secured to the body part. The inner peripheral surface of the seal plate 19 co-operates with the peripheral surface of the adjacent thrust block 13 to form a seal to prevent the passage of hot gases into the bore in the body part in which the shaft is mounted.

At the other end of the shaft is mounted a compressor rotor 20 having radial blades 21, and this rotor is accommodated within a compressor housing 22 having a tangentially disposed outlet 23, and an axially disposed inlet for air 24. Also provided at this end of the body part is an annular seal plate 25 the inner peripheral surface of which co-operates with the peripheral surface of the adjacent thrust block 13 to form a seal to prevent the passage of air into the bore in the body part in which the shaft is mounted.

As shown in FIGURE 1 the outlet 23 of the compressor and the inlet 17 of the turbine are connected to inlet 27 and outlet 28 respectively of a combustion chamber 26. The combustion chamber is supported by a flange connection between its outlet 28 and the turbine inlet 17 and a sleeve coupling 29 is provided intermediate the outlet 23 of the compressor and the inlet 27 of the combustion chamber.

Formed in the body part is a liquid fuel inlet 29a and in use, this is connected by a pipe line 30 ot a fuel tank 31. Within the body part are formed two linet passages 32 which place the inlet 29 in communication with the opposite ends respectively of the bore 10a in the body part in which the shaft 11 is mounted. Moreover, extending from a point in the aforesaid bore intermediate the inner ends of the screw threads 12 is an outlet passage 33 and this passage communicates with an outlet 34. Furthermore, the outlet 34 is in communication by way of a pipeline 35 with a spray nozzle 36 mounted so as to direct liquid fuel into the combustion chamber, there being provided in association with the nozzle, control means 37 whereby the rate at which fuel is delivered to the combustion chamber can be varied.

In use, fuel directed into the combustion chamber is burnt within the air entering the combustion chamber from the compressor. The heated gases leaving the combustion chamber expand through the turbine and pass to the outlet and the turbine is driven by the gases and by way of the shaft thereby imparting rotary motion to the rotor of the compressor. Thus, once the apparatus has been started it is self sustaining. Rotation of the shaft causes fuel to be drawn through the inlet passages 32 by the action of the screw threads 12 and delivered through the outlet passage 33 and outlet 34. Moreover, the fuel also serves as a lubricant for the shaft. In order to start the apparatus, air may be delivered under pressure to the compressor inlet 24 and the fuel mixture may be ignited in any convenient manner within the combustion chamber. Alternatively, a cartridge type starter may be employed which produces a stream of heated gases, which may be used to drive the turbine, by chemical means.

Such apparatus can be used for delivering quantities of heated gases for use in crop drying plants, aircraft engine heaters or the like and the temperature and quantity of heated gas may be adjusted by varying the setting of control means 37. Although in the example described the shaft is supported for rotation by the crests of the screw therads, separate bearings may be provided for the shaft. Moreover, the screw threads may be formed on a part secured to the shaft.

Having thus described my invention what I claim as new and desire to secure by Letters Patent is:

1. Apparatus for supplying heated gases and comprising in combination, a radial flow compressor having a rotor and a tangentially disposed outlet, a co-axially disposed radial flow turbine having a rotor, a tangentially disposed inlet and an outlet through which gases leaving the turbine can pass, a rotary shaft, the rotors of the turbine and compressor being mounted at opposite ends respectively of said rotary shaft, a combustion chamber interconnecting the outlet of the compressor with the inlet of the turbine, a fuel spray nozzle mounted in the combustion chamber and a fuel pump defined by a pair of opposite hand screw threads formed about the axis of the shaft intermediate the rotors and driven by the shaft for delivering fuel under pressure from a source of fuel to the nozzle, the arrangement being such that, in use, heated gases leaving the combustion chamber will drive the turbine as they pass to the turbine outlet, with the turbine serving to drive the compressor and fuel pump to supply air and fuel respectively to the combustion chamber.

2. Apparatus as claimed in claim 1 in which the crests of the screw threads co-operate with the wall of a bore in which the shaft is mounted to form a bearing for the shaft.

3. Apparatus as claimed in claim 2 in which the lubricant for the bearings of the shaft is the liquid fuel which is pumped by the pump to the fuel spray nozzle.

4. Apparatus as claimed in claim 3 including means whereby the rate at which fuel is supplied to the combustion chamber can be varied.

No references cited.

CARLTON R. CROYLE, *Primary Examiner.*

RALPH D. BLAKESLEE, *Assistant Examiner.*